June 29, 1937.  H. B. JONES  2,085,590
STOCK FEEDING MECHANISM
Filed Nov. 27, 1935   5 Sheets-Sheet 2
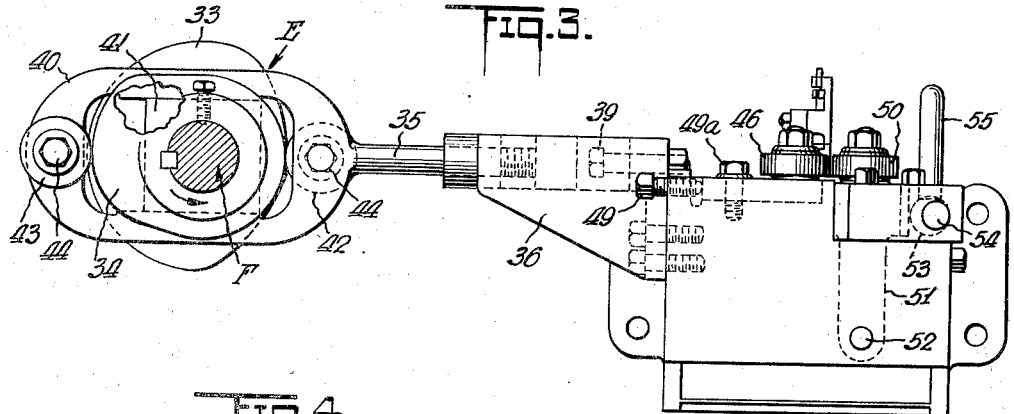
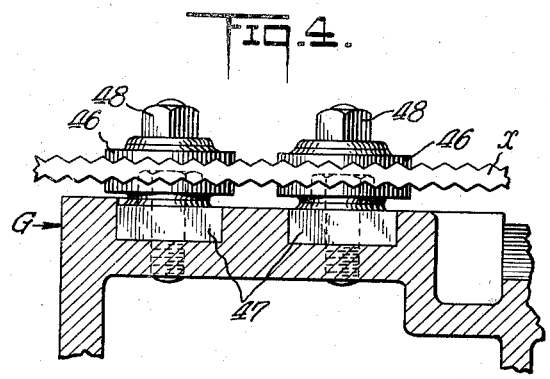
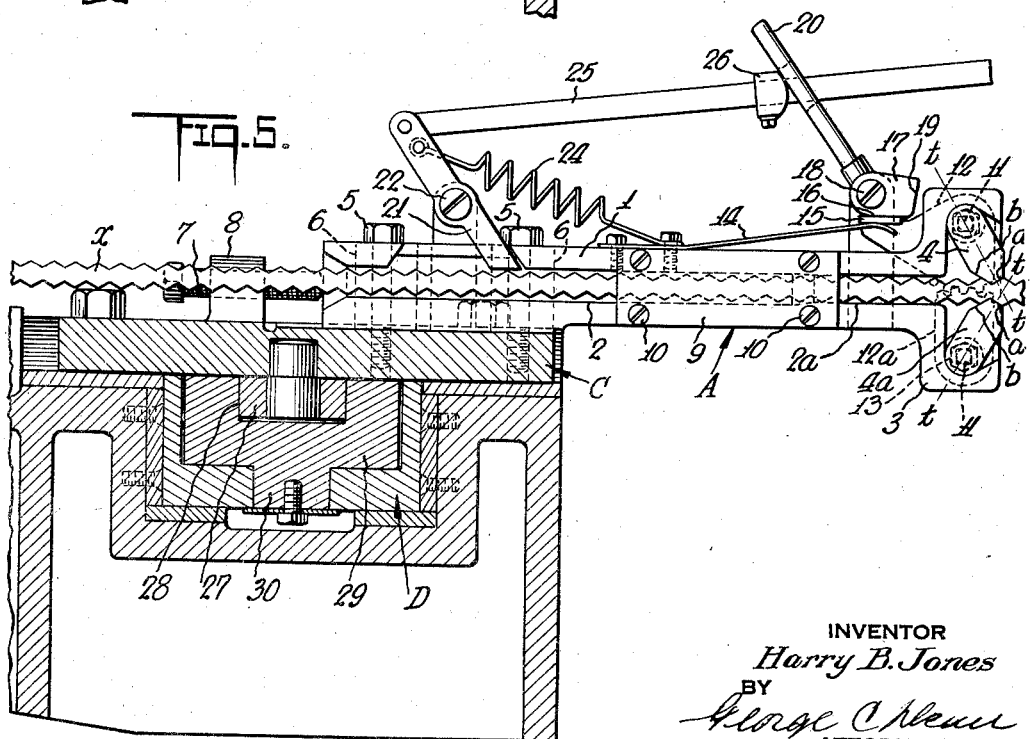
INVENTOR
Harry B. Jones
BY
George C. Shean
ATTORNEY

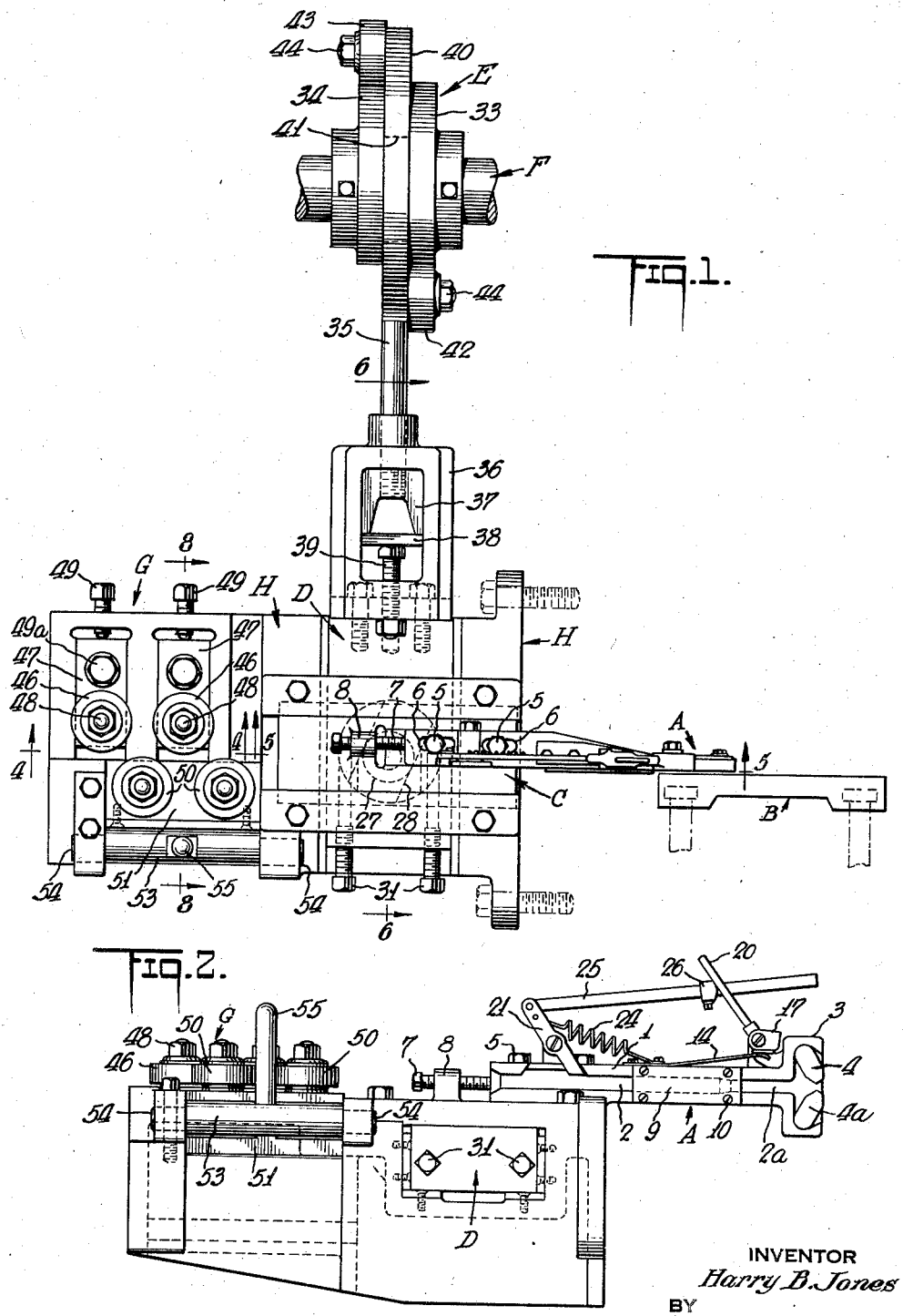

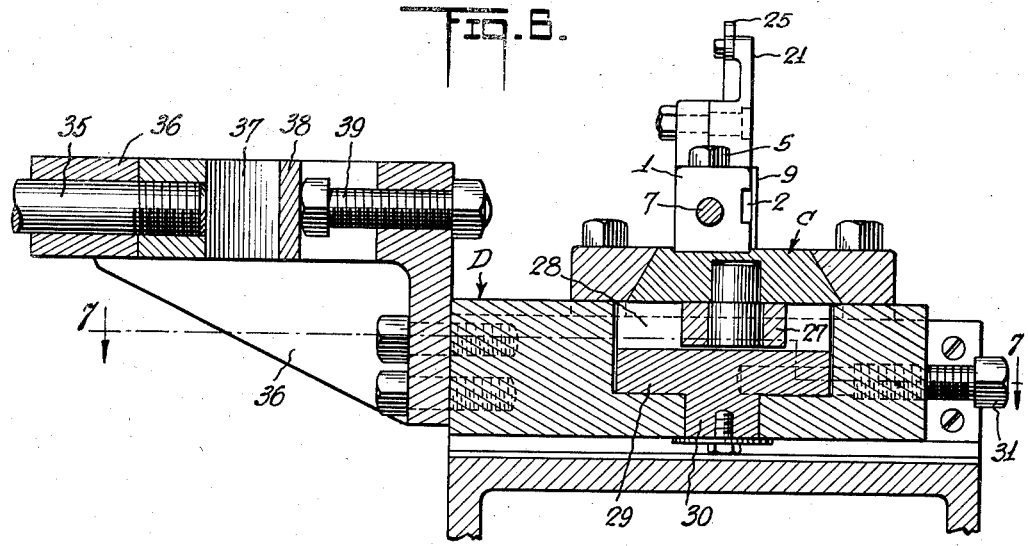
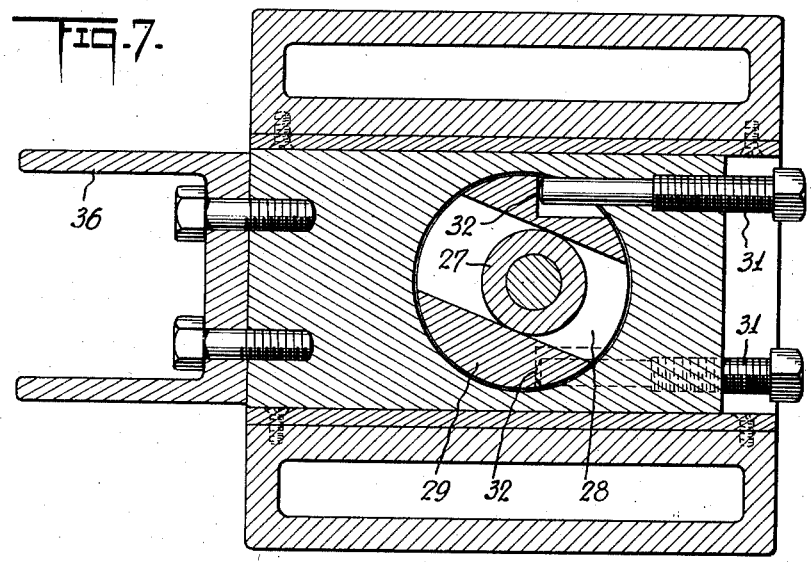

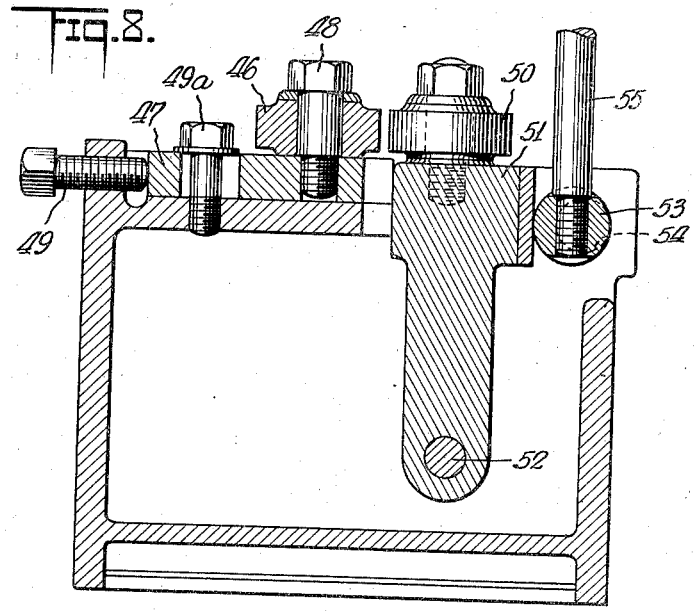
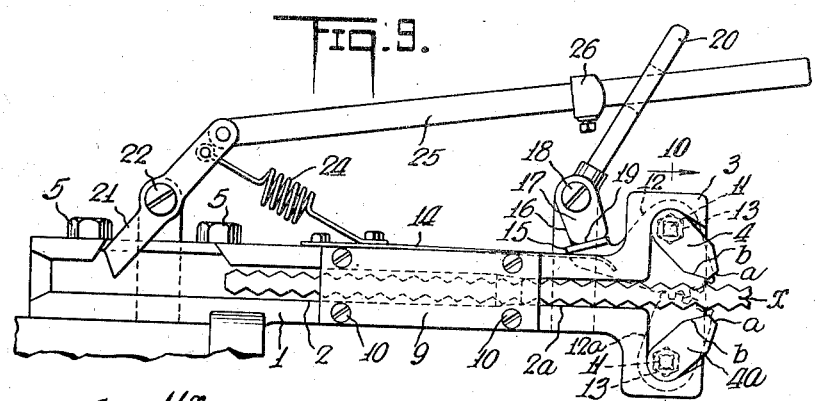
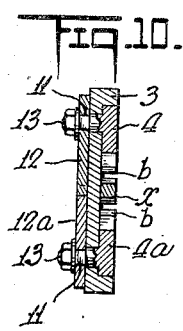
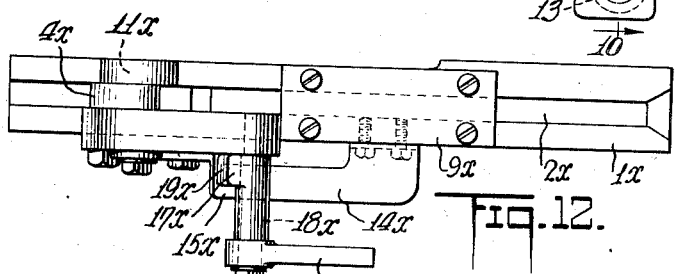
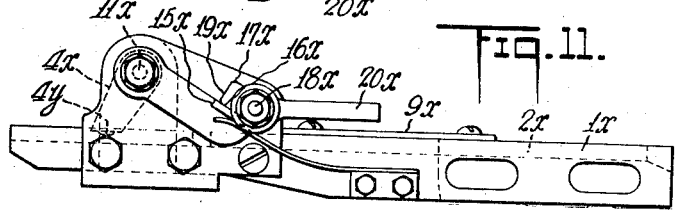

June 29, 1937.  H. B. JONES  2,085,590
STOCK FEEDING MECHANISM
Filed Nov. 27, 1935    5 Sheets-Sheet 5
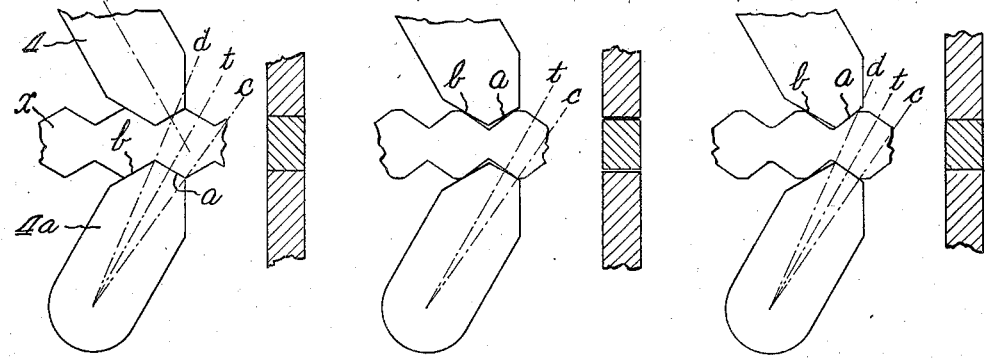
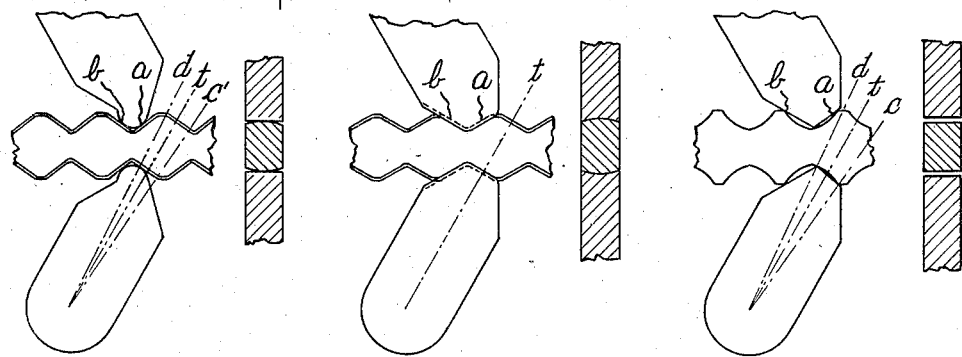
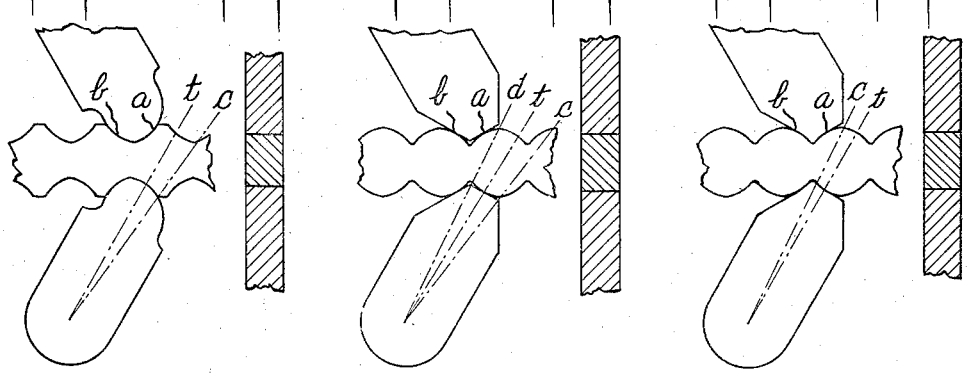
INVENTOR
*Harry B. Jones*
BY
*George C. Jenner*
ATTORNEY.

Patented June 29, 1937

2,085,590

UNITED STATES PATENT OFFICE 2,085,590

STOCK FEEDING MECHANISM

Harry B. Jones, Tonawanda, N. Y., assignor to Buffalo Bolt Company, North Tonawanda, N. Y., a corporation of New York Application November 27, 1935, Serial No. 51,806

41 Claims. (Cl. 10—162)

My present invention relates more particularly to mechanism for step by step feeding of bar stock so as to present the stock in accurate registry with mechanism for operating thereon.

The invention is shown as embodied in a machine that was primarily designed for use in connection with a nut making machine, and more particularly for stock bars that have been roughly pre-formed as connected nut blanks of proper size, by rolling or otherwise forming serrations or notches in opposite edges of the bar.

While some of the more specific novel features of the invention are directly related to the problem of feeding bars having such notches, it will be obvious that other features may be useful for feeding stock of other kinds and shapes, for other purposes.

In the present case, the bar engaging mechanism is designed for serrated bars having notches roughly approximating the V-shape suitable for hex nuts. Being designed for cutting nuts with corners at the edges of the bar, the notch faces are inclined 30°, more or less, to the direction of feed; but for flats at the edges, the notches would be more widely separated, and the faces would approximate a 60° angle. For octagons the angle would be 45°.

A specific object of the invention is to provide a pair of spring pressed fingers that engage opposite notches on opposite edges of the bar, in pawl and ratchet relation, the fingers engaging the notches automatically on the forward feeding movement, and sliding over the bar peaks between the notches on the rearward movement; also to control or modify movements of the bar cooperatively with the fingers, as for instance by friction rolls engaging the sides of the bar, one object being to prevent rearward movement of the bar as the fingers are retracted and their tips slide and snap over the peaks between the bar notches. The rearward movement is preferably sufficient to carry the tips of the fingers a predetermined slight distance behind the bottom of the rearwardly presented face of a notch, so that there will always be opportunity for slight forward movement of the finger tips in the notch as they slide forward and are spring-pressed into engagement with said rear face of the notch.

Other features of the invention, relating to the mechanism for forward and rearward reciprocation of the pawls are specifically designed for use in this particular combination, but they would be useful in connection with other intermittent grip and feed mechanism wherein the distance of forward feed must be accurately adjusted with reference to the center to center length of the blanks for nuts of different size, and with reference to registry with the piercing, crowning, cut off, or other mechanism.

Features of this kind include simple means for predetermining independently, the relative times and speeds of the feeding, retracting and stationary phases in operation of the feed carriage; and regulating the length of the feed movement independently, without altering the relative time and speed ratios of said feed movements.

A simple means for independently accomplishing these independent adjustments, and timing and coordinating the same accurately with respect to the nut machine, as to time and distance of the feed, includes a second slide operating at right angles to the longitudinal movement of the bar feed slide and interconnecting the two by means of a roller on one slide engaging a diagonally disposed, angularly adjustable cam slot member on the other slide. Preferably the adjustable slot member is on the transversely reciprocated slide and the roller for engaging said slot is on the longitudinally reciprocated feed slide.

Timing of the phases of the feed movement independently of the length of said movement as determined by the slot, is effected by employing two separate cams driven from and timed through an operating shaft of the nut machine; one cam being designed to cause a relatively rapid rearward movement of the slide and the other a slower, less rapidly accelerated forward movement, and both cooperatively designed for a relatively long dwell at the end of the forward feed movement, and smooth reversal of movement at the end of the retracting movement.

Important advantages of the bar engaging devices include the self contained, automatic pawl and ratchet relation of the feed fingers to the bar, whereby mechanism for opening and closing the fingers is dispensed with; and the employment of a simple throw-out to spread the fingers out of reach of the bar notches, the throw-out being operated by hand, at any time; or by trigger arrangement which is held inoperative by stock approaching the feed fingers, and released only if and when the supply of stock is not kept up.

The above and other features of my invention may be more fully understood from the following description in connection with the accompanying drawings, in which Fig. 1 is a plan view of the feed mechanism showing its relation and attachability to a nut machine, and its operation by a drive shaft of said machine;

Fig. 2 is the side elevation of the machine shown in Fig. 1;

Fig. 3 is a rear end elevation of the same;

Figs. 4 and 5 are vertical longitudinal sections on the lines 4—4 and 5—5, Fig. 1; Fig. 4 showing the friction guide rolls at the entrance of the machine, and Fig. 5 showing the feed mechanism in section, and the bar feeder in side elevation;

Fig. 6 is a vertical section transversely of the machine, on the line 6—6, Fig. 1;

Fig. 7 is a horizontal section on the line 7—7, Fig. 6;

Fig. 8 is a vertical section on the line 8—8, Fig. 1;

Fig. 9 is a side elevation of the bar feeder, as in Fig. 5, but showing the position of the feed fingers and throw-out after the throw-out has been actuated;

Fig. 10 is a transverse vertical section on the line 10—10, Fig. 9;

Fig. 11 is a top plan view of a modified form of gripping mechanism that may be substituted for the pawl and ratchet mechanism shown in the other figures of the drawings; and Fig. 12 is a side elevation of said modification;

Figs. 13 to 21a are detail views of gripper fingers engaging bar notches of various shapes.

The general organization of the machine may be readily understood by reference to Figs. 1 and 3. Fig. 1 shows the stock feeder A which is arranged to grip and feed the stock step by step along a surface B, which may be considered as representing an element of a nut machine. This feeder is rigidly mounted on slide C reciprocating in housing H, which may be bolted to a nut machine. Slide C is reciprocated by cam slot engagement with a slide D, reciprocating transversely of slide C. Transverse slide D is reciprocated by rotary cam mechanism E on shaft F which latter may be a drive shaft of a nut forming machine such as represented by the surface B. Housing G supports friction rolls which may be straightening rolls, and is rigidly secured to housing H, in alignment with stock feeder A. These rolls control location of the stock and offer predetermined resistance to movement thereof by the feeder.

The bar guiding and gripping device A is a self-contained unit that has only to be reciprocated the proper distances at the proper rates in order to feed the serrated bar step by step, as above described. As best shown in Figs. 2 and 5, it comprises a rigid arm 1, providing a passage 2, 2a through which the stock bar is slidably guided.

The rear end of arm 1 fits a longitudinal guide channel in the upper face of a longitudinally reciprocating slide C, and its forward end terminates in an enlarged head 3 in which the gripper fingers 4, 4a are pivotally mounted. The bolts 5, 5, for securing the rear portion of the slide, pass through slots 6, 6, so as to permit accurate adjustment of the head and gripper fingers longitudinally of the line of feed to the machine into which the stock is to be fed. Accuracy of this adjustment is facilitated by employing a set screw 7 mounted in a projection 8 on slide C, and engaging the rear end of the channel arm 1.

The forward portion 2a of the guide channel fits the serrated edges of the bar more closely than the rear portion 2, the change of height being through an intermediate converging portion. The bar is held in this part of the channel by a lateral guide plate 9 removably secured by screws 10. While this plate might extend the entire length of the channel, I prefer to make it short so that it will not hide the moving members of the feed mechanism, and may be more conveniently removed to laterally expose the entire channel, when necessary.

As shown in Fig. 5, the free ends of the pawl fingers 4, 4a are formed with similar cooperating faces which are shaped so that when engaging a notch they fit into it and engage both surfaces thereof. As shown in dotted lines, on Figs. 5 and 9, and in cross-section in Fig. 10, the fingers are pivoted on studs 11, which are preferably integral therewith, and these studs are rotatably mounted in suitable bearings in the head 3. The ends of these studs are keyed to gear segments 12, 12a, which are rigidly secured to the studs so that the pivotal movements of the notch engaging fingers are equal and opposite. The gear segments may be secured to the studs by making the ends of the studs polygonal, preferably hexagonal, as shown; and clamping the gear segments against shoulders on the ends of studs 11, by nuts 13.

The fingers 4, 4a, are firmly urged to bar engaging position by a spring 14 engaging a tail piece 15 integral with the upper gear segment 12. The swing of the fingers toward alignment, under the pressure of the spring, is limited by having the tail piece 15 contact with a stop surface 16. This surface may be stationary but to facilitate hand or automatic throw-out it is preferably formed on a cam 17 pivoted at 18, which is also formed with a surface 19 at greater radial distance from the pivotal axis than is the stop surface 16. This cam has a handle 20, so that whenever it is desired to stop the feed, the cam may be rotated to depress the tail piece 15, thereby rotating the fingers 4, 4a, against the spring pressure to lift and hold their tips out of reach of the serrations of the stock bar.

Such throw-out for the fingers may be automatically operated by a trigger lever 21, pivoted at 22 on channel arm 1. The lower end of the lever is arranged to be pushed forward and up by the serrated bar, against tension of spring 24, as shown in Fig. 5. When the end of a bar passes this trigger end of lever 21, as shown in Fig. 9, the spring throws the upper arm of the lever forward, actuating a thrust bar 25 which carries an adjustable collar 26 adapted to push the hand lever 20, forward, thereby operating the throw-out cam automatically. The throw-out may be released, and the feed fingers freed, by swinging handle 20 rearwardly, either by hand or by forcing the end of a newly supplied stock bar, against the lower end of the trigger lever 21.

The position of stop 16 bears such relation to the angle of fingers 4, 4a that when the bar notches approximate hex angles, and the tip surfaces, a, b, fully engage the bar notches, the forwardly pushing surface, a, of each finger will be approximately parallel with said rearward surface of the notch; and the line of thrust of the finger will be at an angle of approximately 60° to the line of feed of the stock; and the rearwardly inclined slip surface, b, will be at substantially the same angle to the line of feed, but inclined rearwardly.

Thus arranged, fingers 4, 4a, apply thrust on the bar at a toggle angle of approximately 120°. Thrust along line t, Figs. 5 and 13, is perpendicular to the center of the thrust surfaces a, Fig. 13, and its radius is shorter than along any slanting radial line such as *d* and *c*, Fig. 13. Consequently, the half of face *a*, between *t* and *d* tends to wedge into the notch and the other half between *t* and *c* tends to wedge outwardly. The wedging tendencies along the slanting radii counterbalance because they are equal and opposite.

On the return stroke of the feed slide, the spring 14 holds the finger with face *b* sliding on the bar, *x*, until the long-radius corner, line *d*, can rotate past the short-radius *t*, at the middle of the notch surface. Once past this sticking point, the spring snaps the finger inwardly until the slip surface *b* engages the forwardly presented face of the notch. Thereupon slight forward feed brings the entire thrust face *a*, into the above described counterbalanced wedging engagement with the rearwardly presented face of the notch.

In this forward movement the finger is guided accurately by sliding contact of face *b*, on the slide face of the notch; and this ensures correct positioning of thrust surface *a*, on the thrust surface of the notch. Consequently, the position of the thrust surface of the notch will always be precisely the same, and the blank will register with tool of the nut machine; regardless of variations in the lengths of the blanks.

While variation between any two adjacent notches is likely to be very small, operations at different temperatures may add up to make substantial differences in total distances between blanks that are distant from one another. Moreover, the lost motion is particularly important at the point where the fingers have to slip from the last notch surface on one bar to engage the thrust surface of the first notch on a second bar that is being pushed against the rear end of the first bar. The bar ends are of course cut off at the bottom of a notch, but it is impractical to make the cuts precise enough to avoid non-uniformities of distance between the rear notch thrust surface of one bar and the first notch thrust surface of the following bar.

The longitudinally reciprocating slide C which carries the feed mechanism is itself reciprocated through a roller 27 rigidly secured to and projecting down from a central portion thereof, as shown in Figs. 5, 6, and 7. This roller engages a cam slot 28 carried by the transversely reciprocating carriage D. The slot extends diagonally across the top of a head 29 having a cylindrical downwardly extending projection 30 rotatably mounted in the carriage D.

The slant of slot 28 with respect to the longitudinal movement of the feed carriage C driven thereby, may be accurately adjusted by screws 31, in carriage D, the ends of which engage shoulders 32, as shown in Fig. 7. The slant may be increased to increase the length of feed by backing off one screw and screwing up the other, or vice versa. The cam slot is preferably straight and symmetrically disposed with respect to the vertical pivotal axis of the head, so that the length of the throw of the feed carriage may be adjusted without in any way disturbing the times and rates of the reciprocating feed movements.

As before explained, these times and rates are independently predetermined with respect to the machine to which the blanks are to be fed, by the driving mechanism shown at E and F, Figs. 1 and 3. Slide D is guided by the main housing and is reciprocated by feed cam 33 and retracting cam 34 on the main shaft F of the nut machine, through a rigidly projecting thrust member 35 and bracket 36 which is bolted to the slide D. The end of the thrust member 35 is free to slide through the hole in the bracket 36 and is screwed into the yoke 37 against which plate 38 is held by set screw 39. If, for any reason, the stock bar jams, the plate 38 breaks, thus preventing any other part of the feed from breaking.

The thrust member 35 is rigidly connected to parallel slide member 40 that slides on opposite faces of block 41, which is journalled on the main driveshaft, F, of the nut machine. The slide member carries rolls 42, 43 on pins 44. Cam 33 engaging roll 42 pushes slide D ahead, while cam 34 retracts it.

The position of the serrated bar and its resistance to movement by the feed mechanism, are controlled by the roll assembly G. The rolls 46 are carried on slides 47 by pins 48, and are adjustable to or from the stock by screws 49 and are there held by clamping bolts 49a. Rolls 50 are carried by gate 51 which swings on pin 52 in the main housing (see Figs. 3 and 8). The gate is held in position by an eccentric 53, rotatable on pivot studs 54. These rolls may serve the double purpose of straightening the stock and holding the stock from backing up on the rearward strokes of the arm and fingers.

In starting a new bar or coil of stock, the eccentric 53 is turned back by handle 55, allowing gate 51 to swing out and giving more clearance between the rolls 46 and 50. This permits the stock to pass freely between the rolls, while it is being pushed into the channel slot in arm 1, and through the feed fingers 4, 4a. When the bar has been projected a sufficient distance beyond the fingers, and the fingers are in firm engagement with opposite notches of the bar, and the feed mechanism has advanced the fingers to the cam dwell at the forward end of the feeding stroke, further and more precise centering of a bar blank with respect to a punch or other shaping element of the nut machine, may be had by loosening bolts 5, 5, and sliding the channel arm 1 lengthwise on slide C, as permitted by slots 6, 6. When perfect registry is attained, with arm 1 backed by screw 7, bolts 5, 5, will be screwed tight. The handle 55 is then operated to rotate eccentric 53 and bring rolls 50 into operative clamping relation to rolls 46.

Figs. 11 and 12 show a channel arm, 1*x*, which is used to feed stock which has been rolled with a crowned section and a partly pierced hole. The arm has a single finger and the arrangement is much like that for the arm and toggle finger arrangement used to feed serrated stock, except that there is only one finger and it swings horizontally to snap into the partly pierced hole in the side of the stock bar. The arm 1*x* has a channel 2*x* laterally closed by removable plate 9*x*. The single finger 4*x* has an end stud 4*y*, in place of the hex ends *a*, *b*, and it is non-rotatably secured to a tail piece 15*x*, urged against a stop surface 16*x*, by spring 14*x*. Stop surface 16*x* is on the periphery of a throw-out cam 17*x* which is pivoted on 18*x*, has a second cam face 19*x* more remote from the pivot 18*x*, and can be rotated by handle 20*x*.

Referring again to the above described toggle relation of the fingers 4, 4a, with respect to the notches in the serrated stock, and the fit of thrust and slip surfaces *a*, *b*, in said notches: It will be noted that the notches have been shown as if they were plane surfaces, corresponding to two surfaces of a perfect 120° hexagon. It will be understood, however, that while perfect hex serration may be had by transversely punching or by edgewise swedging, it is only one special case; also the corresponding 120° fit of the tips of the fingers in the notches, and the 120° for the toggle thrust angle, are special cases, selected for purposes of simplified geometry.

As a matter of fact, the bars which I most commonly use are serrated by toothed rolls, and the teeth are not designed so that their rolling contact will generate perfect hex surfaces for the notches; nor is it practically necessary or even desirable that they should do so. In certain cases where the working faces of the teeth are plane from tip to valley, the surface of notches generated thereby are likely to be and preferably are convex from the bottom of the notch to the tip and the tip of the serration shows a small but well defined flat area instead of the sharp 120° peak as shown in the drawings.

The notch surfaces so generated may or may not present a general over-all notch angle of 120°; but even if they do, the bottom part of the notch is likely to have walls diverging substantially less than 120°. The finger tip faces that engage such notch surfaces may continue to have the above referred 120° angle relation, in which case they may have only line contact with the opposite convex surfaces of the notch; or they may be made to fit the sharper V-angle at the bottom of the notch.

In certain cases where the rolls have their tooth surfaces diverging along straight lines from tip to valley, said faces may be transversely concave, in which case the notch surfaces will be convex transversely and the two or three line contacts above referred to will become point contacts.

For certain other purposes it may be desirable to make the notch surfaces more or less concave from valley to tip, but in this case as in the other, the finger tips may be designed to fit the contour of the notch, or only to have two or three-point bearing lines or bearing points in the notch.

With any of the above shapes, the thrust surfaces $a$, at the ends of the fingers may be designed so that part or all of the surfaces, lines or points of engagement with the thrust surfaces of the notch will be at an inward slanting angle, and the resulting inward wedging effect may be counterbalanced either as described above in connection with Fig. 13, or merely by contact of slip surface $b$, with the forwardly presented surface of the notch. If any of the engaging surface is at an outwardly wedging angle, there should be a portion of the tip near the bottom of the notch, of radius greater than that of a perpendicular from the pivot axis to the nearest point of the notch surface, so that this portion of the tip cannot rotate out of the notch, except by carrying the bar forward enough to let its longer radius pass the shorter radius portion of the notch surface.

Various arrangements illustrating those principles are shown in Figs. 13 to 21a. Fig. 13, which is a diagram of the perfect hex notch with perfect hex surfaces $a$, $b$, in combination with the 120° toggle angle, as shown in Fig. 5. Its characteristics, as hereinbefore described, make it easier to understand the essentials of Figs. 14 to 21a.

As to Fig. 13, it will be obvious that it would be entirely operative if the toggle angle of thrust lines $t$, $t$, were much less than 120° because this would put all the thrust on the inner corner indicated by line $d$, and this corner will remain inwardly wedging until the toggle angle is so small that guide surface $b$ will cause it to engage the notch surface at an outwardly wedging angle, that is, outside of shortest radius line $t$.

In Fig. 14, the notch faces have an angle with each other more acute than the faces of the fingers. Consequently, faces $a$ and $b$ bear only on the outer edges of the notches. In this situation, the only line of thrust affording any wedging tendency is along the line $c$, which is a pivotal radius through the point where thrust surface $a$, contacts with the notch. The radius along this line slants outward with respect to the shortest radius along the line $t$, and thrust along line $c$ will be outward wedging unless and until the finger swings outward enough to bring the shortest radius $t$, to the position shown for line $c$, whereupon the inner half of surface $a$, would come into stable, inward-wedging engagement with the surface of the notch. Where the work is light, it is possible that friction and the spring may prevent the initial outward wedging tendency from actually operating as above described, but a normal position of the fingers in an out-wedging position such as indicated in Fig. 14 is undesirable, particularly for very heavy work where the toggle thrust has to be powerful and the surface of the bar notches may be slippery.

A preferable arrangement is that shown in Fig. 15, where face $a$ slants diagonally inward so that all of it is inwardly wedging except the shortest-radius where the thrust is perpendicular to the thrust face of the notch. Thus the entire end of the finger has an inwardly wedging tendency, the same in kind, but greater in degree, than that heretofore described in connection with the half thrust surface between $t$ and $d$, Fig. 13.

Fig. 16 presents a more or less universal solution of the problem, for all sizes, shapes and angles of notches. In this figure, line $c'$ is perpendicular to the thrust face of the notch and the only possible thrust contacts are along and between lines $t$ and $d$. These lines have radii longer than the perpendicular line $c'$, and any part of this surface that can engage any part of the thrust surface of the notch will be inwardly wedging. With such an arrangement, any cylindrical surface with a center somewhere to the left of line $c'$, and of any size suitable for fitting within the notch, will also be inwardly wedging; and the inward wedging will be counterbalanced by the rearwardly presented guide-surface engaging a forwardly presented surface of the notch. Moreover, the opposite engaging surfaces need not be of the same radius; nor need they be true cylinders, provided they have curves with the same slant characteristics. An important advantage of the cylinder form, or any such approximations thereof, is that the toggle angle may be decreased by swinging the pivotal points of the fingers to the left, clear up to the point where line $c'$ would coincide with $d$. Such extremes of adjustment are seldom necessary or desirable.

This Fig. 16 differs from the preceding figures in that the serrations are shown as having been formed by a roll having transversely concave teeth, resulting in a transversely convex edge for the bar. Applied to this bar, as in Fig. 16, each finger has only two points of contact with the notch; but the circular engaging surfaces could be transversely concave to fit the transverse convexity of the notch surfaces.

Fig. 17 illustrates the obvious fact that the ends of the fingers may always be formed to fit all surfaces of the notch, including convexity of the edge thereof.

Fig. 18 shows a notch bar with concavely curved surfaces. Such surfaces may be fitted with fingers adapted for three-point or three-line contact, two of them against the thrust surface of the notch, along lines c and d, which correspond to lines c and d of the finger shown in Fig. 15, and are inwardly wedging.

Fig. 19 shows a bar like Fig. 18, but with the more obvious arrangement involving complete fitting of the surfaces of the finger to the contour of the notch. Here the thrust surface, both along line c and along line t has a very effective inward wedging angle.

Fig. 20 shows a bar with convex surfaces for the notches which is obviously usable with fingers such as shown in Fig. 13. In this Fig. 20, the thrust is in the shortest-radius line t, which is perpendicular to the thrust surface. The radius along this thrust line being the shortest and the lefthand corner of the finger, between t and d being of longer radius, is "locked in". There will be no wedging effect in either direction unless or until the finger is swung to the right, and this will be counteracted by wedging effect produced when any part of half of the finger between t and d slides or tries to slide toward the line t.

Fig. 21 shows a bar with convex serrations, like Fig. 20, but the fingers are shaped to fit the notch. The line t being the perpendicular line of shortest radius, the tip of the finger at the bottom of the notch along line c is longer radius and said tip is locked in. The same thing would be true even if the tip did not extend to the bottom of the notch, but was a small circle such as above described in connection with Fig. 16.

All of these relations are intended to be generically covered by my present disclosure. The point is that the rolled notches will have identical shapes and sizes, even though the stretching caused by indenting and endwise wedging, may sometimes result in minutely different center to center lengths for the blanks; and for this reason the fit and resulting registry of the finger tips in successive notches will be substantially the same even though the distances between notches may be slightly unequal.

As is well known to those skilled in the art, stock for small nut blanks may be thin enough to permit coiling it, provided the coil be of large enough diameter to avoid too sharp curvature; and it will be understood that the stock referred to herein as "bar" stock includes such coiled material, as well as heavy bars that are so thick that coiling is impractical. It will be understood that when the bar stock is coiled, or otherwise bent, the rolls 46, 50 at the entrance of the machine, may be arranged to straighten the stock, as well as afford suitable resistance to movement of the bar when the feeder reciprocates along the same. The only necessary difference between the "straightening" rolls and the "friction" rolls will be the degree of tightness with which they grip the side faces of the bar; and this can be easily varied by shifting the adjustable rolls 46 closer to or farther away from rolls 50. (See Fig. 1.)

I claim:

1. Mechanism for feeding bar stock having depressions constituting connected partly formed nut blanks, including a pivoted, slanting, spring pressed finger shaped to fit the depressions, means for reciprocating said finger to cause it to advance the stock, and a stop mounted on the reciprocating means for limiting the inward spring-pressed movement of the finger.

2. Mechanism for feeding bar stock having depressions each presenting forwardly and rearwardly engageable surfaces and constituting connected partly formed nut blanks, said mechanism including a guide member for the bar, a pivotally mounted slanting detent carried by the guide member, the free end of the detent being formed with corresponding forward and rearward surfaces adapted to bear on the respective rearward and forward surfaces of the depressions, means for moving the detent into engagement with the depressions, and means for reciprocating said guide to effect movement of the stock by the engagement of the detent with the depressions.

3. Mechanism for feeding bar stock having edges similarly and symmetrically notched to form connected nut blanks, including a finger mounted to swing edgewise of the bar to engage the notches and having its free end formed with a transverse surface adapted to apply forward thrust perpendicularly on forward notch surfaces and a rearwardly presented surface adapted to bear upon rear notch surfaces, to gauge the position of said forward thrust surface of the finger with respect to forward notch surfaces, an arm having a guide passage for the bar and on which the finger is mounted, yielding means on said arm engaging a part rigid with said finger for normally holding said finger in operative relation to said stock, and means for reciprocating said arm.

4. Mechanism for feeding bar stock having edges notched to form connected nut blanks, including a reciprocable arm, a forwardly slanting finger pivoted thereon with its free end slidable on the edge of the bar, a tail piece connected with said finger, and a spring engaging said tail piece to spring-press the finger into the notches in combination with a stop carried by said arm for limiting movement of the free end of the finger.

5. Mechanism for feeding bar stock having edges notched to form connected nut blanks, including a device to receive a piece of stock, said device having a pair of oppositely swinging fingers pivoted thereon and having their free ends presented in toggle relation to each other and to the notches in forward feeding movement of said device.

6. Mechanism for feeding bar stock having edges notched to form connected nut blanks, including a reciprocatory bar guide having a spring pressed finger pivotally mounted thereon with its free end arranged to slidably engage the notches, said finger being longer than the normal distance from the pivotal point to the notch surface engaged thereby, and a rearwardly presented slide surface on the free end of the finger for engaging a rear surface of the notch to gauge the finger in forward thrust relation to a rear surface of the notch to secure the bar to the guide when the guide moves forward.

7. Mechanism for feeding bar stock having edges notched to form connected nut blanks, including a finger to engage the notches, an arm having a guide passage for the bar and on which the finger is mounted, yielding means on said arm engaging a part rigid with said finger for normally holding said finger in operative relation to said stock, and means for reciprocating said arm, in combination with a throw out for the fingers including a trigger element normally held inoperative by contact with the bar, but released to operate the throw out when the supply of bar stock fails.

8. Mechanism for feeding bar stock having edges notched to form connected nut blanks, including a pair of fingers disposed in forward-thrust, toggle relation to rearwardly presented faces of the notches, gear segments for causing said fingers to swing equally and oppositely and a spring for keeping their free ends in sliding engagement with the edges of the bar.

9. Feeding mechanism as specified in claim 8 in combination with means associated with one of the fingers for throwing both fingers out of operative relation to the depressions in the bar blanks.

10. Feeding mechanism as specified in claim 8 and a throw-out controlled by the stock for rendering the finger ineffective.

11. Feeding mechanism comprising a device to advance stock, said device carrying a finger, a pivot stud attached to said finger to mount it on said device, a tail piece carried by said stud, a spring on said device engaging the tail piece to hold the finger in operative relation to the stock, a pivoted cam on said device to engage said tail piece, and means for manually rotating the cam against the force of the spring to throw the finger out of operative relation to the stock together with automatic means including a movable member, held inoperative by engagement with the stock, and intermediate connections whereby release of said member by the stock automatically rotates said cam and throws the finger out of operative relation to the stock.

12. Mechanism for feeding bar stock having edges notched to form connected nut blanks, including a finger for advancing stock, means for holding the finger in operative relation, a cam operable to move the finger out of such relation, an arm attached to the cam, a trigger lever held inoperative by engagement with the stock, and a link member connecting the lever to the arm, so that when said lever is released by the stock it moves the link to actuate the arm and cam and throw the finger out of operative relation to the stock.

13. Mechanism for feeding bar stock having edges notched to form connected nut blanks, including a reciprocable slide, a guiding and gripping device thereon and means for rigidly securing the device to the slide, including means permitting adjustment of the device in the direction of feed for accurate registry of the gripping devices and blanks with respect to the machine to which the blanks are supplied in combination with means for reciprocating said slide through distances slightly greater than the center to center lengths of the blanks, including cam means for reciprocating the drive slide most slowly at the beginning of each forward feeding movement and most rapidly during each rearward movement.

14. Mechanism for feeding bar stock formed with depressions constituting connected partly formed nut blanks, including a reciprocable slide, a guiding and gripping device thereon, means comprising bolts in one of said parts passing through slots in the other to enable said slide and said bolt to be variably connected and a projection on one of said parts carrying a threaded bolt to move the other part into adjusted position.

15. Mechanism for feeding bar stock formed with depressions constituting connected partly formed nut blanks, including a bar feeding slide carrying a detent arranged for forwardly-engaging, rearwardly-slipping contact with the depressions and a drive slide transverse to the feed slide, a roller carried by one of said slides, a head having a diagonally disposed cam slot carried by the other slide, means for adjusting the head to change the angle of the slot so that upon actuation of the drive slide, the length of movement imparted to the bar feed slide is made slightly greater than the center to center lengths of the blanks, and cam means designed for reciprocating the drive slide with the slowest part of the movement at the beginning of each forward movement while the detent is moving into feeding engagement with one of the depressions in the bar.

16. Mechanism for feeding bar stock formed with depressions constituting connected partly formed nut blanks, including a slide having a projecting cylindrically surfaced member, a second slide having a rotatable head with a diagonal cam slot to receive the said projecting member whereby reciprocation of one slide reciprocates the other according to the cycle of the driving slide, said head having shoulders, and a pair of screws engaging the shoulders for adjustably rotating the head to vary the slant of said slot and thereby vary the lengths of the reciprocations, without changing the time and speed ratios of the reciprocatory cycle.

17. Mechanism for feeding bar stock formed with depressions at opposite edges constituting connected partly formed nut blanks, including a guiding and intermittently gripping device having a pair of oppositely swinging fingers pivoted thereon and having their free ends presented in toggle relation to each other and to said depressions in forward feeding movement of the device, means for reciprocating said device and effecting gripping of the bar on the forward feeding stroke and release thereof on the back stroke, together with relatively stationary means frictionally engaging the bar to non-positively resist endwise movements of the bar and to prevent reverse motion on the back stroke of said device and to non-positively resist forward movement of the bar until gripped by said toggle fingers.

18. Mechanism for feeding bar stock formed with depressions constituting connected partly formed nut blanks, including a reciprocable guiding and gripping device to feed the bar intermittently in one direction, relatively stationary friction rollers engaging the bar at opposite sides, to non-positively resist endwise movements of the bar in both directions, means for adjusting at least one of said rollers laterally of the bar and for moving the rollers on one side of the bar, into and out of bar engaging position.

19. Feed mechanism as specified in claim 18 and wherein there is a pivoted gate on which the movable rollers are mounted, and the gate is held by an eccentric which is rotatable to hold the gate in selected position, to vary the pressure of the rollers against the stock or permit them to swing out of contact with the bar.

20. Mechanism for feeding bar stock having edges suitably notched to form similar connected nut blanks, including a bar feeder and means for reciprocating the bar feeder, including rotary cam means on a drive shaft of the nut machine which extends parallel with the direction of feed, a rigid power transmitter reciprocated transversely of the shaft and bar feeder, by direct radial push and pull of the rotary cam surfaces so that the lengths and rates of change of length of radii of the cam surfaces are directly translated into cycles of equal lengths and equal rates of change of movements of the power transmitter; the ratios of change of radial lengths of the cam surfaces being designed for repeating cycles of relatively rapid accelerating movement in one direction terminating in smooth reversal, and relatively slow acceleration in the reverse direction terminating in a long dwell; in combination with direction-changing, power-transmitting means whereby the cam actuated power transmitter applies the relative rapid and slow acceleration parts of its cycle for retraction and feed strokes of the feeder without change in the time and speed change ratios of the movements, and means for adjusting the length of the reciprocations of said feeder without changing said ratios of cyclic variations.

21. Mechanism for feeding bar stock having edges suitably notched to form similar connected nut blanks, including means engaging the bar to non-positively oppose longitudinal movement thereof; a bar feeder including a reciprocating slide carrying a forwardly projecting arm having a passage for guiding the bar therethrough parallel with the direction of feed and bar gripping means carried by the forward end of the arm, formed and operated to successively engage bar notches close to the forward end blanks; means for reciprocating the slide, arm and gripper to intermittently engage and advance the bar the distance required to present the end blanks in exact registry with a tool of the nut machine; the reciprocating means including rotary cam means on a drive shaft of the nut machine which extends parallel with the direction of feed, a rigid power transmitter reciprocated transversely of the shaft and bar feeder by direct radial push and pull of the rotary cam surfaces so that the lengths and rates of change of length of radii of the cam surfaces are directly translated into cycles of equal lengths and equal rates of change of movements of the power transmitter; the ratios of change of radial lengths of the cam surfaces being designed for repeating cycles of relatively rapid accelerating movement in one direction terminating in smooth reversal, and relatively slow acceleration in the reverse direction terminating in a long dwell; in combination with direction-changing, power-transmitting means whereby the cam actuated power transmitter applies the relative rapid and slow acceleration parts of its cycle for retraction and feed strokes of the feeder without change in the time and speed change ratios of the movements, and means for adjusting the length of the reciprocations of said feeder without changing said ratios of cyclic variations.

22. Mechanism for feeding bar stock having edges suitably notched to form similar connected nut blanks, including means engaging the bar to afford a predetermined non-positive opposition to longitudinal movement thereof; a bar feeder including a reciprocating slide carrying a forwardly projecting arm having a passage for guiding the bar therethrough parallel with the direction of feed, means for longitudinally adjusting said arm on said slide, bar gripping means carried by the forward end of the arm, formed and operated to successively engage bar notches close to the forward end blanks, and means for reciprocating the slide, arm and gripper to intermittently engage and advance the bar the distance required to present the end blanks in exact registry with a tool of the nut machine.

23. Mechanism for feeding bar stock having edges suitably notched to form similar connected nut blanks, including means engaging the bar to afford a predetermined non-positive opposition to longitudinal movement thereof; a bar feeder including a reciprocating slide carrying a forwardly projecting arm having a passage for guiding the bar therethrough parallel with the direction of feed, means for longitudinally adjusting said arm on said slide, bar gripping means carried by the forward end of the arm, formed and operated to successively engage bar notches close to the forward end blanks, and means for reciprocating the slide, arm and gripper to intermittently engage and advance the bar the distance required to present the end blanks in exact registry with a tool of the nut machine, and to hold them in registered position for a predetermined time for operation thereon.

24. Mechanism for feeding bar stock having edges suitably notched to form similar connected nut blanks, including a bar feeder including a reciprocating slide carrying a forwardly projecting arm having a passage for guiding the bar therethrough parallel with the direction of feed and for holding at its forward end, the bar against movement transverse to its path of travel, bar gripping means carried by the forward end of the arm beyond the forward end of said passage, formed and operated to successively engage and fit in bar notches close to the forward end blanks, and means for reciprocating the slide, arm and gripper to intermittently engage and advance the bar the distance required to present the end blanks in exact registry with a tool of the nut machine.

25. Mechanism for feeding bar stock having edge notches approximating the slant suitable for hex nut blanks, the bar feeder including a reciprocating slide carrying a forwardly projecting arm having a passage for guiding the bar therethrough parallel with the direction of reciprocation, a pair of spring-pressed forwardly slanting fingers pivoted in toggle relation on the forward end of said arm to slip rearward over and thrust forward against notch surfaces close to the forward end blanks, and means for reciprocating the bar feeder through the distance required to present end blanks in exact registry with a tool of the nut machine; the free ends of said fingers having slip and thrust surfaces disposed at angles corresponding approximately to those of the notch surfaces, and arranged to engage both notch surfaces during the forward feed movement.

26. Mechanism for feeding bar stock having edge notches approximating the slant suitable for hex nut blanks, the bar feeder including a reciprocating slide carrying a forwardly projecting arm having a passage for guiding the bar therethrough parallel with the direction of reciprocation, a pair of spring-pressed forwardly slanting fingers pivoted in toggle relation on the forward end of said arm to slip rearward over and thrust forward against notch surfaces close to the forward end blanks, and means for reciprocating the bar feeder through the distance required to present end blanks in exact registry with a tool of the nut machine; the free ends of said fingers having a thrust surface arranged to apply thrust at an angle approximately normal to the rearwardly presented surface of each notch, and a slip surface to engage a forwardly presented surface of the notch and guide the thrust surface of the finger to the same position and the same angle of thrust against the thrust surfaces of successive notches.

27. Mechanism for feeding bar stock having edge notches approximating the slant suitable for hex nut blanks, the bar feeder including a reciprocating slide carrying a forwardly projecting arm having a passage for guiding the bar therethrough parallel with the direction of reciprocation, a spring-pressed forwardly slanting finger pivoted on the forward end of said arm, in toggle relation to the edge of the bar, so as to slip rearward over and thrust forward against notch surfaces close to the forward end blanks, and means for reciprocating the bar feeder through the distance required to present end blanks in exact registry with a tool of the nut machine; the free end of said finger having slip and thrust surfaces disposed at angles corresponding approximately to those of the notch surfaces, and arranged to engage both notch surfaces during the forward feed movement.

28. Mechanism for feeding bar stock having edge notches approximating the slant suitable for hex nut blanks, the bar feeder including a reciprocating slide carrying a forwardly projecting arm having a passage for guiding the bar therethrough parallel with the direction of reciprocation, a pair of spring-pressed forwardly slanting fingers pivoted in toggle relation on the forward end of said arm to slip rearward over and thrust forward against notch surfaces close to the forward end blanks, and means for reciprocating the bar feeder the distance required to present end blanks in exact registry with a tool of the nut machine; the free ends of said fingers being formed with notch engaging surfaces having slant angles the same as said notches so as to fit the notches during the forward feeding movement of the feeder.

29. Mechanism for feeding bar stock having edge notches approximating the slant suitable for hex nut blanks, the bar feeder including a reciprocating slide carrying a forwardly projecting arm having a passage for guiding the bar therethrough parallel with the direction of reciprocation, a pair of detents on the forward end of said arm, spring-pressed into engagement with opposite edges of the bar close to the forward end blanks, and means for reciprocating the bar feeder through the distance required to present end blanks in exact registry with a tool of the nut machine; the bar engaging portion of each detent having a thrust surface arranged to apply thrust upon the rearwardly presented surface of each notch, and a slip surface to engage a forwardly presented surface of the notch and locate the thrust surface of the finger in the same position and at the same angle of thrust with respect to the thrust surfaces of successive notches.

30. Mechanism for feeding bar stock having edge notches approximating the slant suitable for hex nut blanks, the bar feeder including a reciprocating slide carrying a forwardly projecting arm having a passage for guiding the bar therethrough parallel with the direction of reciprocation, a detent on the forward end of said arm, spring-pressed into engagement with the edge of the bar; the bar engaging portion of the detent having a thrust surface arranged to apply thrust upon the rearwardly presented surface of each notch, and a rearward slip surface to engage a forwardly presented surface of the notch to locate the thrust surface of the detent in the same position with respect to the thrust surfaces of successive notches.

31. Mechanism for feeding bar stock having edge notches approximating the slant suitable for hex nut blanks, including a bar feeder and means for reciprocating it, said feeder including a reciprocating slide carrying a forwardly projecting arm having a passage for guiding the bar therethrough parallel with the direction of reciprocation, a pair of spring-pressed forwardly slanting fingers pivoted on said arm, in toggle relation to the edges of the bar, so as to slip rearward over and to thrust forward against the rearwardly presented surfaces of successive notches, the fingers being proportioned and arranged for a toggle thrust angle approximately equal to the slant angle of the notch surface engaged thereby so that the finger thrusts are approximately normal to said surfaces.

32. Mechanism for feeding bar stock having edge notches both faces of which slant outwardly toward the edge at over-all angles of approximately 30° or more to the direction of feed, the bar feeder including bar notch gripping devices, a reciprocating slide, and means for reciprocating it, said gripping devices including a pair of fingers pivotally mounted on the slide, slanting forwardly and spring-pressed for toggle-thrust engagement with opposite notches in the bar, each finger having a surface for rearward slip on the bar surfaces, and a forward thrust surface for engagement with the forwardly and outwardly-slanting, rearwardly-presented surfaces of the notches; each said thrust surface contacting with an outwardly slanting notch surface at a point where a line of thrust from the pivot to the notch surfaces is perpendicular to said notch surface.

33. Mechanism for feeding bar stock having edge notches both faces of which slant outwardly toward the edge at overall angles of approximately 30° or more to the direction of feed, the bar feeder including bar notch gripping devices, a reciprocating slide, and means for reciprocating it, said gripping devices including a pair of fingers pivotally mounted on the slide, slanting forwardly and spring-pressed for toggle-thrust engagement with opposite notches in the bar, each finger having a surface for rearward slip on the bar surfaces, and a forward thrust surface for engagement with the forwardly and outwardly-slanting, rearwardly-presented surfaces of the notches; each said thrust surface contacting with an outwardly slanting notch surface at a point where a line of thrust from the pivot to the notch surface slants inward and tends to wedge the end of the finger toward the bottom of the notch when the slanting toggle thrust is applied.

34. Mechanism for feeding bar stock having edge notches both faces of which slant outwardly toward the edge at over-all angles of approximately 30° or more to the direction of feed, the bar feeder including bar notch gripping devices, a reciprocating slide, and means for reciprocating it, said gripping devices including a pair of fingers pivotally mounted on the slide, slanting forwardly and spring-pressed for toggle-thrust engagement with opposite notches in the bar, each finger having a surface for rearward slip on the bar surfaces, and a forward thrust surface for engagement with the forwardly and outwardly-slanting, rearwardly-presented surfaces of the notches; each said thrust surface contacting with an outwardly slanting notch surface at a point where a line of thrust from the pivot to the notch surfaces is perpendicular to said notch surface, and also at another point where such a line slants inward and tends to wedge the end of the finger toward the bottom of the notch when the slanting toggle thrust is applied.

35. Mechanism for feeding bar stock having edge notches both faces of which slant outwardly toward the edge at over-all angles of approximately 30° or more to the direction of feed, the bar feeder including bar notch gripping devices, a reciprocating slide, and means for reciprocating it, said gripping devices including a pair of fingers pivotally mounted on the slide, slanting forwardly and spring-pressed for toggle-thrust engagement with opposite notches in the bar, each finger having a rearward slip surface, and a forward thrust surface for engagement with the forwardly and outwardly-slanting, rearwardly-presented surfaces of the notches; each said thrust surface contacting with the outwardly slanting notch surface at points where some of the lines of thrust from the pivot slant inwardly and others slant outwardly, but in counterbalancing, stable relation, so that the resultant thrust is practically without outward wedging tendency.

36. Mechanism for feeding bar stock having edge notches both faces of which slant outwardly to the edge at over-all angles of approximately 30° or more to the direction of feed, a bar feeder including a notch gripping device, a reciprocating slide, and means for reciprocating it, said gripping device including a thrust support engaging one edge of the bar, and a finger pivotally mounted on the slide, slanting forwardly and spring-pressed toward the opposite edge of the bar, said finger having a surface for rearward slip on the bar surfaces, and a forward thrust surface for engagement with the outwardly-slanting, rearwardly-presented surfaces of the notches; said thrust surface contacting with the outwardly slanting notch surface at a point where thrust from the pivot to the notch surface slants inward and tends to wedge the end of the finger toward the bottom of the notch when forward thrust is applied.

37. Mechanism for feeding bar stock having edge notches both faces of which slant outwardly to the edge at over-all angles of approximately 30° or more to the direction of feed, a bar feeder including a notch gripping device, a reciprocating slide, and means for reciprocating it, said gripping device including a thrust support engaging one edge of the bar, and a finger pivotally mounted on the slide, slanting forwardly and spring-pressed toward the opposite edge of the bar, said finger having a surface for rearward slip on the bar surfaces, and a forward thrust surface for engagement with the outwardly-slanting, rearwardly-presented surfaces of the notches; said thrust surface contacting with the outwardly slanting notch surface at a point where thrust from the pivot to the notch surface is perpendicular to said notch surface.

38. Mechanism for feeding bar stock having edge notches both faces of which slant outwardly to the edge at over-all angles of approximately 30° or more to the direction of feed, a bar feeder including a notch gripping device, a reciprocating slide, and means for reciprocating it, said gripping device including a thrust support engaging one edge of the bar, and a finger pivotally mounted on the slide, slanting forwardly and spring-pressed toward the opposite edge of the bar, said finger having a surface for rearward slip on the bar surfaces, and a forward thrust surface for engagement with the outwardly-slanting, rearwardly-presented surfaces of the notches; said thrust surface contacting with the outwardly slanting notch surface at a point where thrust from the pivot to the notch surface is perpendicular to said notch surface and also at another point where such a line slants inward and tends to wedge the end of the finger toward the bottom of the notch when forward thrust is applied.

39. Mechanism for feeding bar stock having edge notches both faces of which slant outwardly to the edge at over-all angles of approximately 30° or more to the direction of feed, a bar feeder including a notch gripping device, a reciprocating slide, and means for reciprocating it, said gripping device including a thrust support engaging one edge of the bar, and a finger pivotally mounted on the slide, slanting forwardly and spring-pressed toward the opposite edge of the bar, said finger having a rearward slip surface, and a forward thrust surface for engagement with the outwardly-slanting, rearwardly-presented surface of the notches; said thrust surface contacting with the outwardly slanting notch surface at points where some of the lines of thrust from the pivot to the notch surface slant inwardly and others slant outwardly, but in counterbalancing stable relation, so that the resultant thrust is practically without outward wedging tendency.

40. Mechanism for feeding bar stock with similar, regularly spaced depressions constituting roughly formed nut blanks, including a reciprocable slide carrying one or more pivoted, spring-pressed fingers arranged to engage and apply forward inward thrust on a rearwardly directed surface of each depression, connections for actuating said feeder comprising means for varying the length of the stroke of the feeder to make it slightly greater than the center to center length of the blanks, and independent means for adjustably locating the range limits between which the stroke of said length is made.

41. Mechanism for feeding bar stock formed with similar, oppositely registering, regularly spaced notches constituting connected roughly formed nut blanks, including a reciprocable bar feeder carrying one or more pivoted, spring-pressed fingers successively engaging notches in the bar and intermittently advancing it by forward, inward thrust against rearwardly directed surfaces of the notches, in combination with feeder actuating means including primary driving means reciprocating according to a predetermined cycle of varying speed, dwell and reversals, intermediate power transmitting means for varying the length of the reciprocations to make them slightly greater than the center to center length of the blanks, without changing said predetermined cycle, and means for adjustably locating the end points of the range between which the feeder moves for a stroke of the above described length.

HARRY B. JONES.